(12) United States Patent
Hayashibara

(10) Patent No.: US 8,089,837 B2
(45) Date of Patent: Jan. 3, 2012

(54) OPTICAL DISK PLAYER

(75) Inventor: Kazuki Hayashibara, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1442 days.

(21) Appl. No.: 11/603,104

(22) Filed: Nov. 22, 2006

(65) Prior Publication Data

US 2007/0115143 A1 May 24, 2007

(30) Foreign Application Priority Data

Nov. 24, 2005 (JP) ................................. 2005-338310

(51) Int. Cl.
*G11B 17/00* (2006.01)
(52) U.S. Cl. ................. 369/47.43; 369/47.41; 369/59.25
(58) Field of Classification Search ............... 369/47.41,
369/47.43, 30.09, 30.03, 47.1, 47.22, 124.08;
700/94; 386/231, 125; 370/235, 338, 401;
381/101, 128, 401; 341/14, 50
See application file for complete search history.

(56) References Cited

U.S. PATENT DOCUMENTS

| | | | | |
|---|---|---|---|---|
| 5,477,517 A * | 12/1995 | Gehringer et al. | ......... | 369/47.43 |
| 5,608,713 A * | 3/1997 | Akagiri et al. | ........... | 369/124.08 |
| 6,738,559 B1 * | 5/2004 | Yoo et al. | ....................... | 386/231 |
| 7,257,060 B2 * | 8/2007 | Sako et al. | ................. | 369/47.22 |
| 7,672,742 B2 * | 3/2010 | Ng et al. | .......................... | 700/94 |
| 7,742,606 B2 * | 6/2010 | Kreifeldt et al. | ................ | 381/58 |
| 7,844,355 B2 * | 11/2010 | Yahata et al. | ................... | 700/94 |
| 7,929,446 B2 * | 4/2011 | Bozarth et al. | ................ | 370/235 |
| 2001/0055253 A1 * | 12/2001 | Bresit | ........................ | 369/47.41 |
| 2004/0001601 A1 * | 1/2004 | Wang | ............................. | 381/124 |
| 2004/0052191 A1 * | 3/2004 | Sako et al. | .................. | 369/59.25 |
| 2004/0101148 A1 * | 5/2004 | Pyle et al. | ...................... | 381/101 |
| 2005/0157599 A1 * | 7/2005 | Kiyama et al. | ............. | 369/30.03 |
| 2005/0249484 A1 * | 11/2005 | Ng et al. | ........................ | 386/125 |
| 2005/0254363 A1 * | 11/2005 | Hamada et al. | .............. | 369/47.1 |
| 2006/0034299 A1 * | 2/2006 | Barzegar et al. | .............. | 370/401 |
| 2006/0034481 A1 * | 2/2006 | Barzegar et al. | .............. | 381/401 |
| 2006/0087458 A1 * | 4/2006 | Rodigast et al. | ................ | 341/50 |
| 2006/0153155 A1 * | 7/2006 | Jacobsen et al. | .............. | 370/338 |
| 2007/0217297 A1 * | 9/2007 | Kato et al. | ................. | 369/30.09 |

FOREIGN PATENT DOCUMENTS

| | | |
|---|---|---|
| JP | 2001 84214 A | 3/2001 |
| JP | 2001-306097 A | 11/2001 |
| JP | 2002-16878 A | 1/2002 |
| JP | 2002-74828 A | 3/2002 |

(Continued)

OTHER PUBLICATIONS

Notice of the Reason for Refusal dated May 13, 2008 with English translation (Five (5) Pages).

(Continued)

*Primary Examiner* — Thuy Pardo
(74) *Attorney, Agent, or Firm* — Crowell & Moring LLP

(57) ABSTRACT

When an optical disk player is switched on, a controller obtains information of a sampling frequency or sampling frequencies that are supported by an appliance that is connected to the optical disc player through an HDMI cable. Then, when a playing start command is input, it is judged whether the connected appliance supports the audio output or not. When the connected appliance supports the audio output, and the sampling frequency of a sound source is larger than the sampling frequency or frequencies that the connected appliance supports, the audio signals are down-sampled to fit the connected appliance. Output of the audio signals is then started.

11 Claims, 2 Drawing Sheets

FOREIGN PATENT DOCUMENTS

| | | |
|---|---|---|
| JP | 2003-208200 A | 7/2003 |
| JP | 2004-241921 A | 8/2004 |
| JP | 2005-198208 A | 7/2005 |
| JP | 2006-294120 A | 10/2006 |

OTHER PUBLICATIONS

Japanese Office Action dated Aug. 5, 2008 with English translation (Four (4) pages).

* cited by examiner

| AUDIO SAMPLING FREQUENCY OF SOURCE | CONNECTED APPLIANCE DOES NOT SUPPORT AUDIO | CONNECTED APPLIANCE SUPPORTS ONLY 44.1kHz | CONNECTED APPLIANCE SUPPORTS 44.1/48kHz | CONNECTED APPLIANCE SUPPORTS 44.1/48/96kHz | CONNECTED APPLIANCE SUPPORTS 44.1/48/96/192kHz |
|---|---|---|---|---|---|
| 44.1kHz | MUTE | 44.1kHz | 44.1kHz | 44.1kHz | 44.1kHz |
| 48kHz | MUTE | 44.1kHz | 48kHz | 48kHz | 48kHz |
| 96kHz | MUTE | 44.1kHz | 48kHz | 96kHz | 96kHz |
| 192kHz | MUTE | 44.1kHz | 48kHz | 96kHz | 192kHz |

OPTICAL DISK PLAYER

BACKGROUND OF THE INVENTION

1. Field of the Invention

The present invention relates to an optical disk player, an audio signal output device, and an AV system which output audio signals to an audio output amplifier through an HDMI (High-Definition Multimedia Interface) cable.

2. Description of the Related Art

Conventionally, audio signals which are sampled at 44.1 kHz of sampling frequency are recorded in an audio CD (Compact Disk). Recently, with generalization of optical disks such as a high-capacity DVD (Digital Versatile Disk) and so on, audio signals are sampled at high sampling frequency of 48 kHz, 96 kHz, or 192 kHz and recorded in the optical disc so as to meet needs for further high-quality sound. The optical disk players are conventionally adapted to play the audio signals which are recorded at various sampling frequencies as described above.

Moreover, the optical disk players in recent years are constituted to produce a surround sound effect when a plurality of speakers equal to or more than four are connected thereto through an audio output amplifier which supports multi-channels. The optical disk player is normally connected to the audio output amplifier through an HDMI (High-Definition Multimedia Interface) cable.

Japanese Laid-Open Patent Publication No. 2001-306097 discloses an audio coding device which performs a down-sampling of sub-band signals of a frequency in each band corresponding to output sub-band signals Furthermore, Japanese Laid-Open Patent Publication No. 2002-74828 discloses a DVD player which outputs audio signals with being down-sampled to have 48 kHz of sampling frequency, in case that the audio signals are scrambled. On the other hand, Japanese Laid-Open Patent Publication No. 2003-208200 discloses a signal playing method to convert a sampling frequency of received compressed data according to its playable time.

However, some audio output amplifiers distributed to the market do not support the high sampling frequency of 48 kHz, 96 kHz, and 192 kHz, and thus, when audio signals, having a sampling frequency which is not supported, are inputted to such an audio output amplifier, a problem arises that a playing can not appropriately be carried out due to the occurrence of noises or skipping of sound.

SUMMARY OF THE INVENTION

And an object of the present invention is to provide an optical disk player, an audio signal output device, and an AV system comprising them, which enables an appropriate playing of sound, even when an audio output amplifier which does not support the high sampling frequency is connected.

An optical disk player in accordance with an aspect of the present invention comprises: an optical pickup which reads out signals from an optical disc by irradiating a laser beam on the optical disk; a signal processing means which processes the signals read out by the optical pickup; a signal decoding means which decodes the signals processed by the signal processing means; an HDMI (High-Definition Multimedia Interface) output terminal to which an HDMI cable is connected and outputs the signals decoded by the signal decoding means to outside of the player through the HDMI cable; and a control means which controls the optical pickup, the signal processing means, and the signal decoding means.

When an appliance is connected to the HDMI output terminal through the HDMI cable, the control means obtains information of audio sampling frequency or frequencies that the appliance supports. When the connected appliance does not support audio output, no audio signals are outputted from the HDMI output terminal. When the connected appliance supports the audio output, and also when an audio sampling frequency of a sound source is larger than the audio sampling frequency or all of the sampling frequencies that the connected appliance supports, the audio signals decoded by the signal decoding means are down-sampled to have the sampling frequency or one of the sampling frequencies that the connected appliance supports, and then, the down-sampled audio signals are outputted to the connected appliance.

On the other hand, an audio signal output device in accordance with an aspect of the present invention comprises an HDMI (High-Definition Multimedia Interface) output terminal to which an HDMI cable is connected and outputs audio signals to outside. When an appliance is connected to the HDMI output terminal through the HDMI cable, the control means obtains information of audio sampling frequency or frequencies that the appliance supports. When an audio sampling frequency of a sound source is larger than the audio sampling frequency or all of the sampling frequencies that the connected appliance supports, the audio signals are down-sampled to have a sampling frequency that the connected appliance supports, and then, the down-sampled audio signals are outputted to the connected appliance.

Moreover, an AV system in accordance with an aspect of the present invention an optical disc player, an audio output amplifier in compliance with five-channels-compliant, a speakers system of five-channels-compliant, and a monitor display device.

The optical disk player further comprises: an optical pickup which reads out signals from an optical disc by irradiating a laser beam on the optical disk; a signal processing means which processes the signals read out by the optical pickup; a signal decoding means which decodes the signals processed by the signal processing means; an HDMI (High-Definition Multimedia Interface) output terminal to which an HDMI cable is connected and outputs the signals decoded by the signal decoding means to outside of the player through the HDMI cable; and a control means which controls the optical pickup, the signal processing means, and the signal decoding means. When an appliance including the audio output amplifier is connected to the HDMI output terminal through the HDMI cable, the control means obtains information of sampling frequency or frequencies that the appliance supports. When the connected appliance does not support audio output, no audio signal is outputted from the HDMI output terminal. When the connected appliance supports the audio output, and also when an audio sampling frequency of a sound source is larger than the audio sampling frequency or all of the sampling frequencies that the connected appliance supports, the audio signals decoded by the signal decoding means are down-sampled to have the sampling frequency or one of the sampling frequencies that the connected appliance supports, and then, the down-sampled audio signals are outputted to the connected appliance.

According to the above mentioned configuration, when the audio sampling frequency of the source is larger than the sampling frequency or all of the sampling frequencies that the connected appliance supports, the control means performs the down-sampling process to the audio signals decoded by the signal decoding means so as to fit the sampling frequency that the connected appliance supports, and then outputs the down-sampled audio signals to the connected appliance. Thereby, the audio signals can be played appropriately, even when the appliance which does not support the high sampling frequency is connected to the optical disc player. Moreover, when the connected appliance does not support the audio output, the control means does not output the audio signal from the HDMI output terminal, thus the video signals is secure from noises due to unnecessary audio signals, and a clear vision can be displayed on, for example, a monitor display device.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
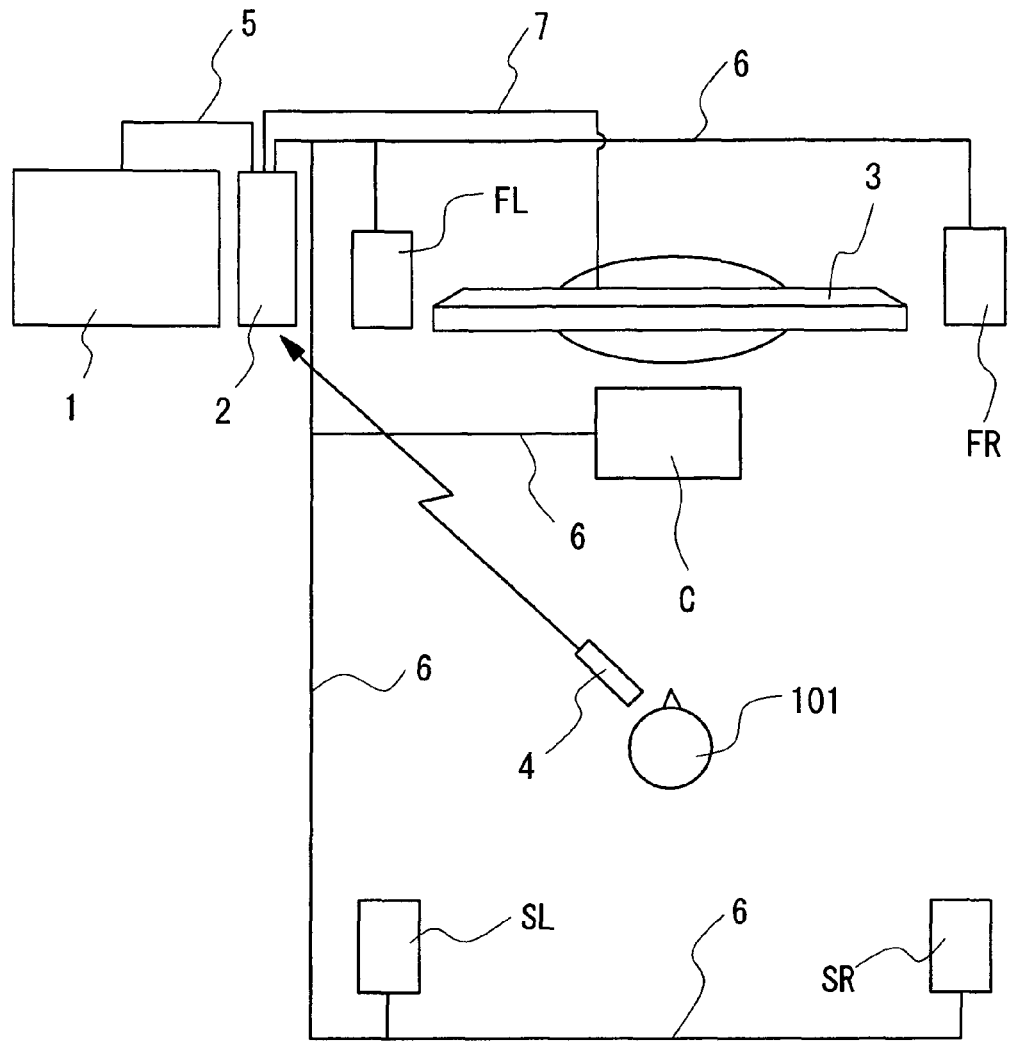
FIG. 1 is a drawing showing a composition of an AV system in accordance with an embodiment of the present invention.

A preferred embodiment of the present invention is described with reference to the attached drawings. FIG. 1 shows a constitution of an AV (Audio Visual) system 100 such as a home theater system using an optical disk player 1. The AV system 100 comprises the optical disk player 1 which reproduces video signals and audio signals recorded on an optical disk such as a DVD, an audio output amplifier 2 which is in compliance with five-channels, amplifies the audio signals reproduced by the optical disk player 1 and then outputs the amplified audio signals, a speaker FL (Front Left), a speaker FR (Front Right), a speaker C (Center), a speaker SL (Surround Left), and a speaker SR (Surround Right) which output sound in response to the audio signals outputted from the audio output amplifier 2, a monitor display device 3 such as an LCD (Liquid Crystal Display) device which displays an image on a screen in response to the video signals reproduced by the optical disk player 1, a remote controller 4 which is operated by a user 101 to input various commands to the optical disk player 1 and the audio output amplifier 2, and so on. The user 101 can make a choice of the speakers FL, FR, C, SL, and SR appropriate to the user's taste.

The optical disk player 1 is connected to the audio output amplifier 2 through an HDMI (High-Definition Multimedia Interface) cable 5, so that digital signals are transmitted from the optical disc player 1 to the audio output amplifier 2. The audio output amplifier 2 is connected to the respective speakers FL, FR, C, SL, and SR through normal speaker cables 6, and analog audio signals amplified through the audio output amplifier 2 are transmitted to the speakers FL, FR, C, SL, and SR. The audio output amplifier 2 is further connected to the monitor display device 3 through a video output cable 7 which is in compliance with digital signals or analog signals. Thus, the video signals are outputted to the monitor display device 3 through the audio output amplifier 2 from the optical disk player. Alternatively, the video signals may directly be outputted to the monitor display device 3 from the optical disk player 1.

Figure 2:
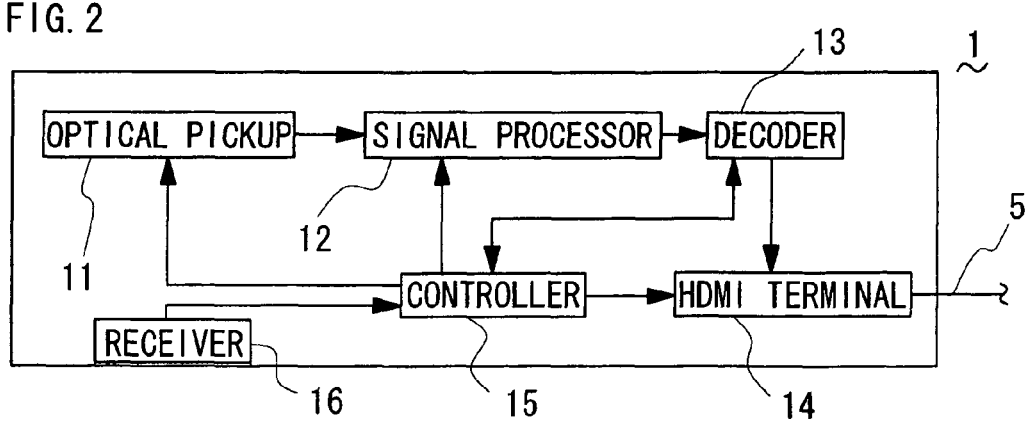
FIG. 2 is a block diagram showing a composition of an optical disk player applied to the AV system.

FIG. 2 shows a block configuration of the optical disk player 1. The optical disk player 1 comprises an optical pickup 11 which reads out signals from an optical disc with irradiating a laser beam on the optical disk, a signal processor (signal processing means) 12 which processes the signals, which are read out by the optical pickup 11, a decoder (signal decoding means) 13 which decodes the signals processed by the signal processor 12, an HDMI output terminal 14 to which the HDMI cable 5 is connected and then outputs the signals decoded by the decoder 13 to outside of the optical disc player 1, a controller (control means) 15 which controls the optical pickup 11, the signal processor 12, and the decoder 13, a receiver 16 which receives a command transmitted from the remote controller 4, and so on.

The optical disk player 1 of this embodiment has a function to perform down-sampling of audio signals from a sound source and output the down-sampled audio signals according to a sampling frequency which is supported by the audio output amplifier 2. The user can enable or disable this function by operating the remote controller 4.

Figures 3, 4:
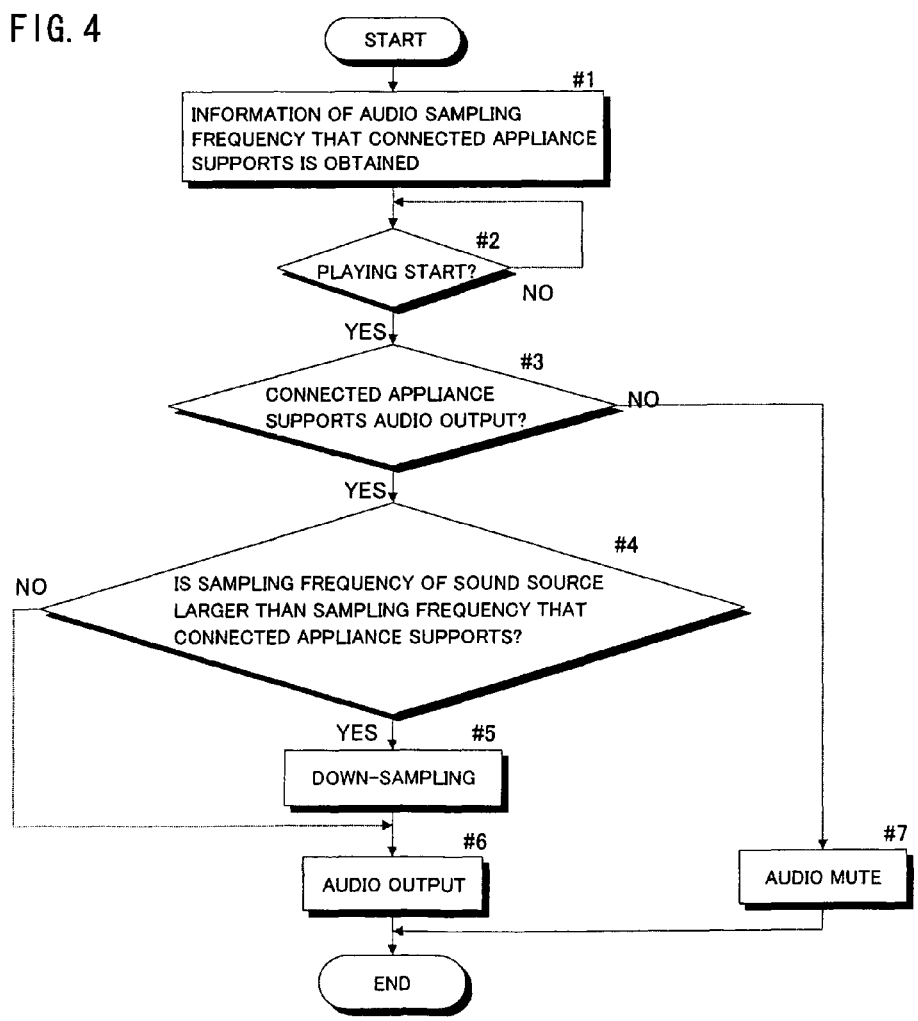
FIG. 3 is a table showing sampling frequencies of audio signals outputted from the optical disk player to an audio output amplifier in case that various appliances are connected and various sources are played.
FIG. 4 is a flowchart showing a process in a controller before starting to play audio signals.

FIG. 3 shows examples of sampling frequencies of the audio signals which are outputted from the optical disk player 1 to the audio output amplifier 2. The sampling frequency of the audio signals, which are outputted to an appliance connected to the optical disk player 1 (for example, the audio output amplifier 2 in the AV system 100 shown in FIG. 1), is switched corresponding to the sampling frequency or frequencies of the sound source and the sampling frequency or frequencies that are supported by the connected appliance.

For example, when a video projector (image projecting device) is connected to the AV system 100 as the monitor display device 3 and the projector is not connected to the audio output amplifier 2, no audio signal is outputted from the optical disc player 1 because the video projector generally does not support the audio signals.

Alternatively, it is assumed that an LCD device is directly connected to the optical disc player 1 instead of the AV system 100, and the LCD supports only the sampling frequency of 44.1 kHz. As can be seen from FIG. 3, although the audio sampling frequency of the sound source is one of 44.1 kHz, 48 kHz, 96 kHz and 192 kHz, the LCD supports only the sampling frequency of 44.1 kHz. Thus, with respect to the audio signals of the sampling frequency of 48 kHz, 96 kHz or 192 kHz of the sound source, the audio signals are down-sampled by the optical disc player 1 to have the sampling frequency of 44.1 kHz, and the down-sampled audio signals are outputted to the LCD from the optical disc player 1. With respect to the audio signals of the sampling frequency of 44.1 kHz, the audio signals are directly outputted to the LCD from the optical disc player without being down-sampled.

Similarly, it is assumed that a television receiver is directly connected to the optical disc player 1 instead of the AV system 100, and the television receiver supports the sampling frequencies of 44.1 kHz and 48 kHz. With respect to the audio signals of the sampling frequency of 96 kHz or 192 kHz of the sound source, the audio signals are down-sampled by the optical disc player 1 to have the sampling frequency of 48 kHz, and the down-sampled audio signals are outputted to the television receiver from the optical disc player 1. The audio signals of the sampling frequency of 44.1 kHz or 48 kHz which are not down-sampled are directly outputted to the television receiver from the optical disc player 1 without being down-sampled.

Similarly, it is assumed that an appliance such as audio output amplifier of an audio system which does not support the high sampling frequency is connected to the optical disc player, and the audio output amplifier supports the sampling frequencies of 44.1 kHz, 48 kHz and 96 kHz. With respect to the audio signals of the sampling frequency of 192 kHz of the sound source, the audio signals are down-sampled by the optical disc player 1 to have the sampling frequency of 96 kHz, and the down-sampled audio signals are outputted to the television receiver from the optical disc player 1. On the contrary, the audio signals of the sampling frequency of 44.1 kHz, 48 kHz or 96 kHz are directly outputted to the television receiver from the optical disc player 1 without being down-sampled.

In contrast, it is assumed that an appliance such as audio output amplifier of the AV system is connected to the optical disc player, and the audio output amplifier supports the sampling frequencies of 44.1 kHz, 48 kHz, 96 kHz and 192 kHz. The audio signals from the sound source are directly outputted to the audio output amplifier from the optical disc player 1 without being down-sampled.

In summary, when the appliance connected to the optical disc player 1 supports the sampling frequency of the source (for example, when the connected appliance supports the sampling frequencies of 44.1 kHz, 48 kHz and 96 kHz and the sampling frequency of the source is 96 kHz), the audio signals are output from the optical disk player 1 without being down-sampled.

FIG. 4 shows a process in the controller 15 before starting to play the audio signals. When the optical disk player 1 is switched on, the controller 15 firstly obtains information of the audio sampling frequencies that the connected appliance supports through the HDMI cable 5 (step #1). Then, when a command of starting to play is inputted through the remote controller 4 (YES in step #2), it is judged whether the connected appliance supports the audio output or not (step #3). This judgment is based on the information of the audio sampling frequency obtained in the step #1. When it is judged that the connected appliance does not support the audio output (NO in step #3), no audio signal is outputted (step #7). Accordingly, only the video signals are outputted in this case.

On the contrary, when it is judged that the connected appliance supports the audio output (YES in step #3), the sampling frequency of the sound source is compared with the sampling frequency or frequencies that the connected appliance supports (step #4). When the audio sampling frequency of the sound source is larger than the sampling frequency or all of the sampling frequencies that the connected appliance supports (YES in step #4), the audio signals are down-sampled to have the largest frequency among the sampling frequencies that the connected appliance supports (step #5), and then, output of the audio signals is started (step #6). When the sampling frequency of the sound source is equal to the sampling frequency or any one of the sampling frequencies that the connected appliance supports (NO in step #4), then the step #5 is skipped, and output of the audio signals is started without being down-sampled (step #6).

As described above, according to the optical disk player 1 of this embodiment, when the audio sampling frequency of the sound source is larger than the sampling frequency or all of the sampling frequencies that the connected appliance supports, the controller 15 performs the down-sampling process to the audio signals decoded by the decoder 13 in response to the connected appliance, and outputs the down-sampled audio signals to the connected appliance. Thus, even if the audio output amplifier 2 which does not support the high sampling frequency is connected to the optical disc player 1, the audio signals can be played appropriately. Moreover, when the connected appliance does not support the audio output, the controller 15 does not output the audio signals from the HDMI output terminal 14, so that the video signals are secured from noises due to an unnecessary audio signals, and a clear vision can be displayed on the monitor display device 3.

The present invention is not limited to the constitution of the above mentioned embodiment, and thereby, it may be constituted that the sampling frequencies that the connected appliance supports can be obtained through the HDMI cable before starting to play the audio signals, and the sampling frequency of the audio signals from the sound source is down-sampled corresponding to the sampling frequency that the connected appliance supports. Moreover, the present invention is not limited to the optical disk player. It is widely applicable to an audio signal output device included in, for example, a television receiver which supports several sampling frequencies and also outputs audio signals.

This application is based on Japanese patent application 2005-338310 filed Nov. 24, 2005 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical disk player comprising:
   an optical pickup which reads out signals from an optical disk by irradiating a laser beam on the optical disk;
   a signal processing means which processes the signals read out by the optical pickup;
   a signal decoding means which decodes the signals processed by the signal processing means;
   an HDMI (High-Definition Multimedia Interface) output terminal to which an HDMI cable is connected and outputs the signals decoded by the signal decoding means to outside of the player through the HDMI cable; and
   a control means which controls the optical pickup, the signal processing means, and the signal decoding means, wherein
   when an appliance is connected to the HDMI output terminal through the HDMI cable, the control means obtains information of sampling frequency or frequencies that the appliance supports;
   when the connected appliance does not support audio output, no audio signal is outputted from the HDMI output terminal; and
   when the connected appliance supports the audio output, and also when an audio sampling frequency of a sound source recorded in the optical disk is larger than the audio sampling frequency or all of the sampling frequencies that the connected appliance supports, the audio signals decoded by the signal decoding means are down-sampled to have the sampling frequency or one of the sampling frequencies that the connected appliance supports, and then, the down-sampled audio signals are outputted to the connected appliance.

2. The optical disk player in accordance with claim 1, wherein
   the audio signals are down-sampled to have the largest frequency among the sampling frequencies that the connected appliance supports.

3. The optical disk player in accordance with claim 1, wherein
the optical head supports a plurality of audio sampling frequencies of the sound sources.

4. The optical disk player in accordance with claim 1, wherein
the appliance connected to the HDMI output terminal through the HDMI cable is an audio output amplifier which is in compliance with five-channels-compliant.

5. The optical disk player in accordance with claim 1, wherein
the appliance connected to the HDMI output terminal through the HDMI cable is a liquid crystal display device or a television receiver.

6. An audio signal output device comprising an HDMI (High-Definition Multimedia Interface) output terminal to which an HDMI cable is connected and outputs audio signals to outside, wherein
when an appliance is connected to the HDMI output terminal through the HDMI cable, the control means obtains information of audio sampling frequency or frequencies that the appliance supports; and
when an audio sampling frequency of a sound source recorded in an optical disk is larger than the audio sampling frequency or all of the sampling frequencies that the connected appliance supports, the audio signals are down-sampled to have a sampling frequency that the connected appliance supports, and then, the down-sampled audio signals are outputted to the connected appliance.

7. The audio signal output device in accordance with claim 6, wherein
the audio signals are down-sampled to have the largest frequency among the sampling frequencies that the connected appliance supports.

8. An AV system comprising an optical disk player, an audio output amplifier in compliance with five-channels-compliant, a speakers system of five-channels-compliant, and a monitor display device, wherein
the optical disk player further comprises: an optical pickup which reads out signals from an optical disk by irradiating a laser beam on the optical disk; a signal processing means which processes the signals read out by the optical pickup; a signal decoding means which decodes the signals processed by the signal processing means; an HDMI (High-Definition Multimedia Interface) output terminal to which an HDMI cable is connected and outputs the signals decoded by the signal decoding means to outside of the player through the HDMI cable; and a control means which controls the optical pickup, the signal processing means, and the signal decoding means;
when an appliance including the audio output amplifier is connected to the HDMI output terminal through the HDMI cable, the control means obtains information of sampling frequency or frequencies that the appliance supports;
when the connected appliance does not support audio output, no audio signal is outputted from the HDMI output terminal; and
when the connected appliance supports the audio output, and also when an audio sampling frequency of a sound source recorded in the optical disk is larger than the audio sampling frequency or all of the sampling frequencies that the connected appliance supports, the audio signals decoded by the signal decoding means are down-sampled to have the sampling frequency or one of the sampling frequencies that the connected appliance supports, and then, the down-sampled audio signals are outputted to the connected appliance.

9. The AV system in accordance with claim 8, wherein
the audio signals are down-sampled to have the largest frequency among the sampling frequencies that the connected appliance supports.

10. The AV system in accordance with claim 8, wherein
the optical head supports a plurality of audio sampling frequencies of the sound sources.

11. The AV system in accordance with claim 8, wherein
the appliance connected to the HDMI output terminal through the HDMI cable other than the audio output amplifier is a liquid crystal display device or a television receiver.

* * * * *